Jan. 23, 1934. H. MATTHEWS ET AL 1,944,254
MACHINE FOR FASTENING LIDS TO HAMPERS AND BASKETS
Filed April 25, 1933 3 Sheets-Sheet 3
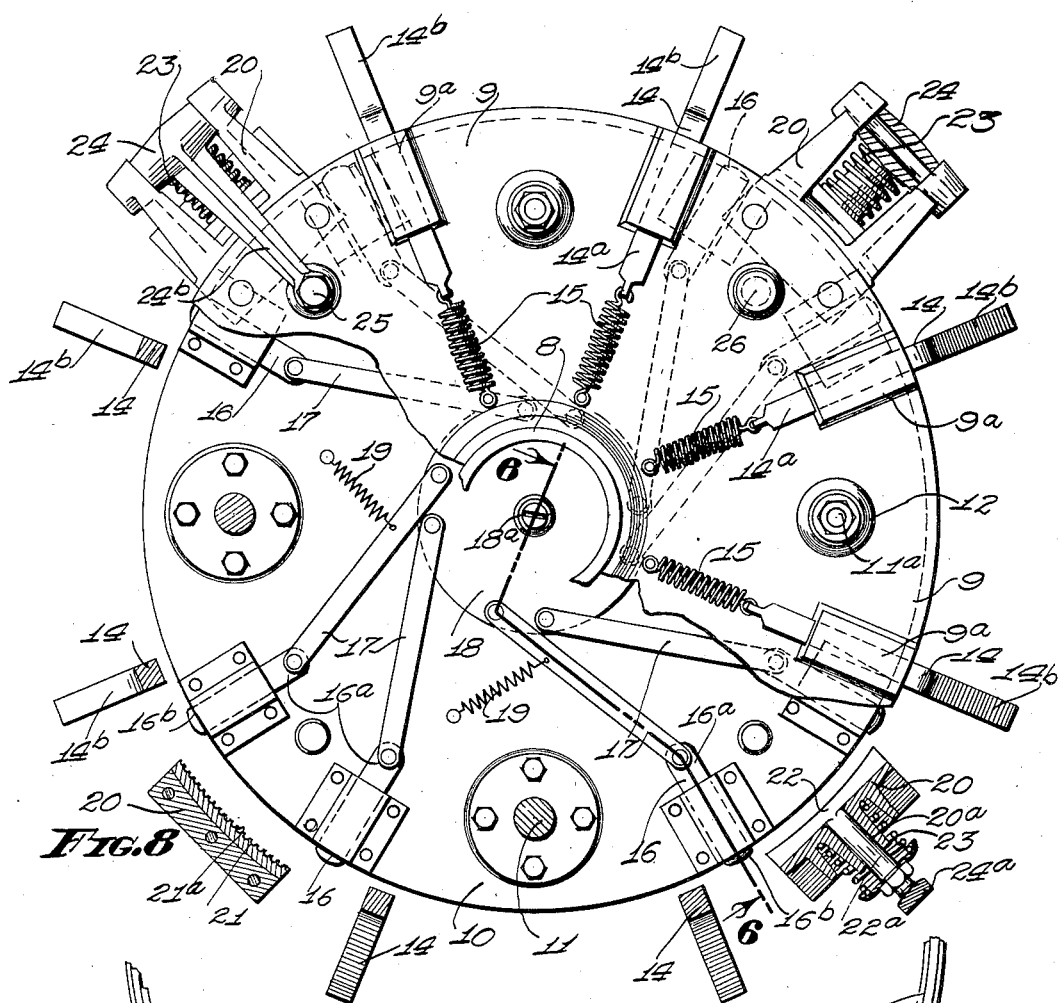
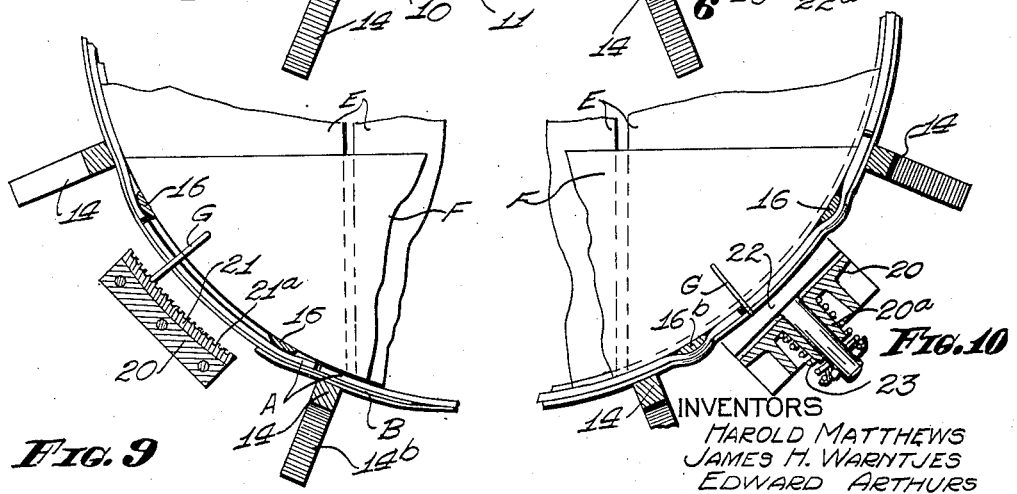
INVENTORS
HAROLD MATTHEWS
JAMES H. WARNTJES
EDWARD ARTHURS
WILLIAM C. WILKINSON
BY Lloyd Spencer
ATTORNEY Patented Jan. 23, 1934

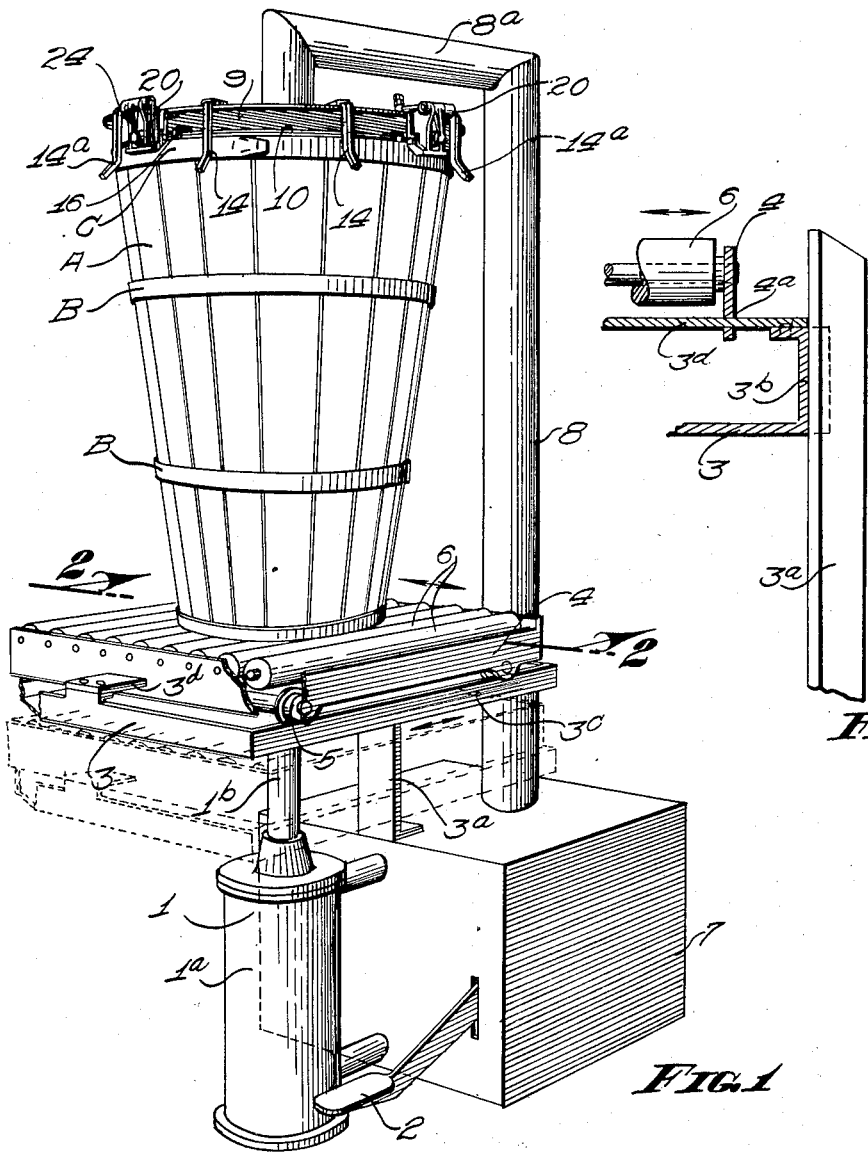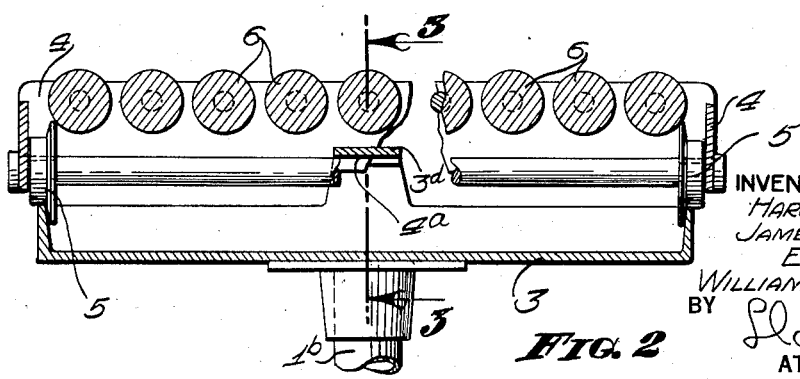

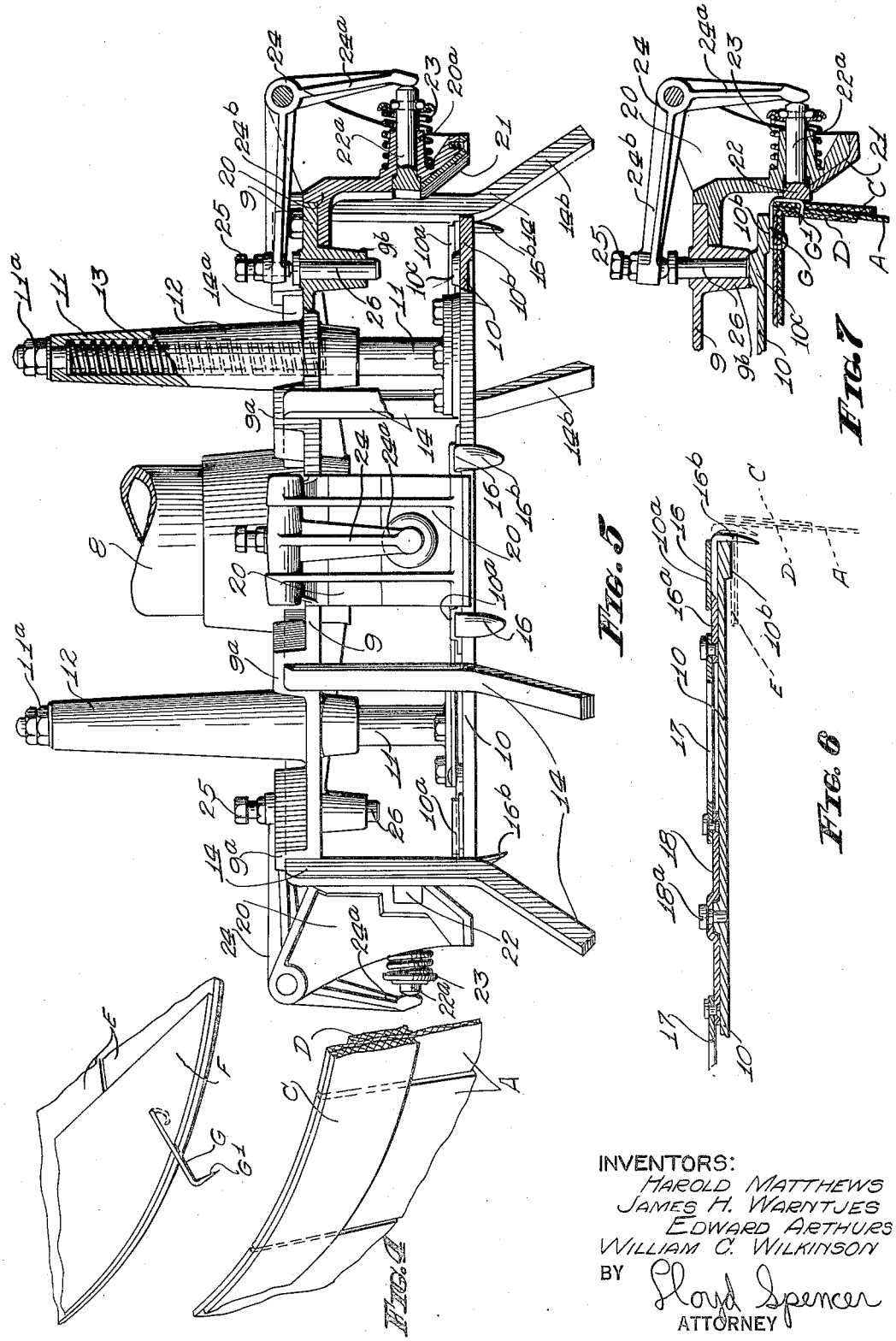

1,944,254

UNITED STATES PATENT OFFICE 1,944,254

MACHINE FOR FASTENING LIDS TO HAMPERS AND BASKETS

Harold Matthews, James Henry Warntjes, Edward Arthurs, and William Carl Wilkinson, Calipatria, Calif., assignors of one-fourth to San Diego Fruit and Produce Company, San Diego, Calif., a corporation of California Application April 25, 1933. Serial No. 667,807

17 Claims. (Cl. 140—93)

Our invention relates to basket and hamper lid fastening machines and the objects of our invention are:

First, to provide a machine of this class which is particularly arranged to act upon baskets and hampers and their lids wherein the lids are previously provided with securing staples extending therefrom in position to be forced into securing relation with the basket, such baskets or hampers and their lids being formed of light wood and designed to receive vegetables or fruits, particularly green peas;

Second, to provide a machine of this class which incorporates a novel means for holding the lid, guiding the same into an inserted relation with the basket or hamper and temporarily bracing the somewhat frail basket or hamper during the securing operation;

Third, to provide a machine of this class which incorporates a novel arrangement whereby the basket or hamper is automatically centered as the lid and basket or hamper are brought into position, said arrangement adapted to form a section of a conveyor or similar apparatus whereby the basket may be quickly moved into position on the machine and away from the machine upon completion of the lidding operation;

Fourth, to provide in conjunction with a machine of this class a centering arrangement which automatically compensates for any irregularities in the shape of the basket;

Fifth, to provide a machine of this class which in no manner injures or crushes the contents of the basket although the basket be frail;

Sixth, to provide a machine of this class wherein the entire lidding operation is accomplished with one movement, the several securing staples being simultaneously fastened, thereby providing a machine which is particularly rapid in its action; and, Seventh, to provide on the whole a novelly constructed basket lid fastening machine which is simple and compact of construction proportional to its functions, durable, efficient in its action, and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon, which form a part of the application, in which:

Figure 1 is a perspective view of the basket and hamper lid fastening machine with the machine in the position assumed during the lidding operation; Fig. 2 is a transverse sectional view of the centering platform taken through 2—2 of Fig. 1 with parts and portions shown in elevation to facilitate the illustration; Fig. 3 is a fragmentary sectional view through 3—3 of Fig. 2 also with parts and portions in elevation; Fig. 4 is a fragmentary perspective view of the basket or hamper and its lid particularly suited for the fastening machine; Fig. 5 is a partial sectional, partial elevational view of the fastening portion of the machine; Fig. 6 is a sectional view of the lid retaining and guide mechanism taken through 6—6 of Fig. 8; Fig. 7 is a fragmentary sectional view through 7—7 of Fig. 5 with the elements of the machine in the positions assumed upon completion of the lidding operation; Fig. 8 is a partial plan, partial sectional view of the fastening portion of the machine; Fig. 9 is a fragmentary sectional-plan view of the machine with the lid and basket or hamper and elements of the machine in the positions assumed at the beginning of the securing operation; and Fig. 10 is a similar sectional-plan view with the parts in the position assumed upon completion of the lidding operation.

Similar characters of reference refer to similar parts and portions throughout the several views of the drawings.

Hydraulic elevating means 1, foot lever 2, table 3, frame 4, wheels 5, rollers 6, base 7, post 8, supporting plate 9, lid carrying disk 10, rods 11, sleeves 12, springs 13, centering bars 14, springs 15, gripping and guide fingers 16, links 17, operating wheel 18, springs 19, brackets 20, staple bending cams 21, cinching bars 22, springs 23, levers 24, set screws 25, and lifting pins 26 constitute the principal parts and portions of the basket lid fastening machine.

The machine herein described is particularly designed to fasten the lids of light wooden baskets and hampers. These baskets and hampers comprise upwardly directed and diverging slats A, bound by a plurality of bands B. The upper margin of the basket or hamper is provided with a main band C around the outside of the slats and an inner band D secured within and slightly below the upper edge of the basket or hamper so as to form a shoulder. The lid is flat and comprises a plurality of slats E connected by cross members F, these members being trimmed to form a circular disk adapted to fit within the basket or hamper and rest upon the shoulder formed by the inner band D. The lid is provided with a plurality of radially extending staples G which are provided with downwardly and inwardly extending pointed end portions G1. The lidding operation consists in forcing the projecting portions of the staples over the band C so that the points G1 are forced into the basket or hamper.

The lid fastening machine includes a hydraulic elevating means 1 which comprises a cylinder 1a and an upwardly directed piston rod 1b. The hydraulic elevating means is preferably controlled by a foot lever 2 which is connected to any suitable control apparatus.

Secured to the upper end of the piston rod 1b is a table 3. The table 3 is held against rotation by a guide 3a which is connected with any suitable fixed support and which protrudes through a slotted bracket 3b carried by the table at its rear side as shown best in Fig. 3. A frame 4 is provided to which are secured wheels 5 adapted to ride on track portions 3c formed along two margins of the table 3. The frame 4 carries a plurality of rollers 6 disposed with their axis at right angles to the wheels 5. The rollers form a section of a conveyer, not shown, which is preferably flush with the rollers when the hydraulic means is in its lower position indicated by dotted lines in Fig. 1. The wheels and rollers allow forward and backward as well as lateral shifting of a basket or hamper positioned thereon. The frame 4 is held upon the table 3 by a bar 3d which extends horizontally through slots 4a in the frame and is secured at its extremities to the table 3 as shown best in Figs. 2 and 3.

A lid securing portion is positioned above the above-described structure. The lid securing portion is supported from a base 7 and a post 8 which extends upwardly therefrom and includes a forwardly directed arm portion 8a overhanging the table 3.

Secured to the extremity of the overhanging portion 8a of the post is a supporting plate 9 which is flat and circular, and approximately the diameter of the lid of the basket. Suspended below the plate 9 is a lid carrying disk 10 which is also flat, circular and slightly smaller than the plate 9. The disk 10 is provided with several upwardly directed rods 11 arranged in equally spaced relation which extend through sleeves 12 formed in or secured to the plate 9. Springs 13 are arranged within the sleeves 12 in such a manner as to force the disk 10 downwardly until limited by suitable stops 11a at the upper extremities of the rods 11.

The periferial portion of the plate 9 is provided with a plurality of radially directed guides 9a. Slidably mounted in the guides are radially directed arms 14a of centering bars 14. The bars overhang the edge of the plate 9 and depend vertically therefrom, the lower extremities forming outwardly and downwardly directing portions 14b. Secured to the radially inner ends of the arms 14a are springs 15 which are suitably anchored to the plate 9 and tend to hold the centering bars in their radially inner positions.

The springs are designed to withstand the force exerted by the centering bars as the basket or hamper is engaged by the directing portions and shifted by means of the rollers 6 and wheels 5 into centered relation with the plate 9 and disk 10. However, the centering bars normally define an area slightly smaller than the basket or hamper so that upon forcing the basket or hamper between the vertical portions of the centering bars, the springs permit yielding of the bars and adjustment thereof to compensate for irregularities in the shape of the basket or hamper.

The lid carrying disk 10 is also provided with radially directed guides 10a arranged about its periphery. These slidably support gripping or guide fingers 16. Each finger 16 includes a bar portion 16a mounted within a guide 10a and an integral prong or finger 16b which overhangs the edge of the disk 10, as shown best in Figs. 5 and 6. The prongs 16b are bluntly pointed and are slightly radially inwardly curved towards their lower ends. The radially inner extremities of the bar portions 16a are rotatably secured to links 17 which extend inwardly in offset relation with the center of the disk. Here the links 17 are rotatably secured to a centrally disposed operating wheel 18 in the form of a plate secured at its center to the disk 10 by a journal pin 18a. Springs 19 are connected to certain of the links 17 as shown in Fig. 8 and are suitably anchored to the disk 10. These springs are arranged to draw the fingers 16 to their radially inner positions limited by the edge of the disk 10, as shown best in Fig. 8.

It is preferred to provide eight centering bars 14 and an equal number of fingers 16. The centering bars are arranged in equally spaced relation, but the fingers 16 are preferably grouped in pairs offset arcuately from the corresponding bars 14.

The prongs or fingers 16 operate in unison by reason of their connection with the operating wheel 18, hence by pressing outwardly with an edge of a basket or hamper lid against a pair of the fingers the remainder expand to permit the lid to be inserted within the prongs and held thereby against the underside of the disk 10, the inturning of the prongs tending to force the lid into contiguous relation with the disk. It is preferred that the disk engage the lid at its peripheral portion; hence, this portion is thickened as indicated by 10b.

The lid carries four of the staples G and the lid is inserted so as to position the staples between the members of each pair of fingers 16.

Above each pair of fingers 16 there is secured to the plate 9 a depending bracket 20. The disk normally occupies a position adjacent to the lower extremities of the brackets 20 but is adapted to rise into the area defined by the brackets. Each bracket extends vertically downwardly except for its lower portion which slopes radially outwardly and downwardly. These lower portions are provided with staple bending cams 21 which are integral or secured thereto in the form of removable guards.

The mouth of the basket or hamper upon being raised engages the fingers 16 on their outer sides, as shown by dotted lines in Fig. 6, so that the fingers not only hold the lid but guide the basket or hamper into its proper relation therewith, and further, reinforce the basket or hamper during the securing operation. The pressure of the basket or hamper against the disk 10 raises it whereby the staples which protrude are engaged by the bending cams 21, as shown best in Fig. 9, and are bent downwardly forcing the points G1 into the basket or hamper. In order to prevent lateral bending of the staples, the bending cams 21 are provided with a plurality of vertically directed grooves 21a as shown best in Figs. 8 and 9.

Above the bending cams 21, each bracket 20 is provided with a horizontally extending slot in which is mounted a cinching bar 22. Each cinching bar 22 is provided at its central portion with an outwardly extending stem 22a which is slidably mounted in a suitable boss 20a of the bracket. Each stem 22a protrudes from its boss and is held in such protruding relation by a spring 23; thus yieldably holding the corresponding cinching bar in its retracted position within the margins of the bracket 20 as shown best in Figs. 5 and 8. When the disk, lid, and staples move above the bending cams 21 the staples occupy positions opposite the cinching bars 22, whereupon the cinching bars may be moved radially inwardly pressing the staples into the basket or hamper as shown in Figs. 7 and 10. The bars 22 are preferably given an upwardly and outwardly slope conforming to the slope of the basket or hamper so as to force the lower portions of the staples adjacent to their pointed ends firmly against the basket or hamper.

The brackets 20 and their bending cams 21 and cinching bars 22 are as wide as is possible and curved arcuately whereby the lids need not be placed with their staples in any particular position as long as they are opposite the brackets 20.

The brackets 20 also support L-shaped levers 24. One leg 24a of each lever extends downwardly so as to engage the extremity of a cinching bar stem 22a and the other leg 24b of which extends radially inwardly over the supporting plate 9, and is provided at its extremity with a downwardly direct set screw 25. The several set screws are adapted to be engaged by lifting pins 26 positioned in sleeves 9b formed in the supporting plate 9. The pins are flanged at their upper ends so that their downward movement is limited. The lower ends of the pins 26 protrude from the sleeves 9b and are adapted to be engaged by low bosses 10c protruding upwardly from the disk 10. The pins are engaged when the disk has almost reached its upper position so that the cinching bars 22 are forced inwardly by means of the pins 26 and levers 24 at the proper time.

In brief, the operation of the basket and hamper lid fastening machine is as follows:

A filled basket or hamper is brought by a conveyor to the lifting platform formed by the table and elevating means. The basket or hamper is rolled thereon and a lid is positioned under the disk 10, whereupon the lever 2 is depressed causing operation of the elevating means 1. The fingers 16 guide the basket or hamper around the lid, the bending cams act upon the extremities of the staples, and the cinching bars complete the lidding operation as the elevating means continues its upward movement. It should be noted that the fingers 16 act to prevent the crushing of the basket or hamper and the bending cams and cinching bars cause inward pressure against the basket or hamper.

When lidding operation is completed, the weight of the basket or hamper and its contents is sufficient to withdraw the prongs from the basket or hamper whereby the basket or hamper springs into its normal position snugly encircling the edge of the lid.

Though we have shown and described a particular construction, combination and arrangement of parts and portions, we do not wish to be limited to this construction, combination and arrangement but desire to include in the scope of our invention the construction, combination and arrangement substantially as set forth in the appended claims.

Having thus described our invention, what we claim as new and desire to secure by Letters Patent is:

1. In a machine for fastening lids on baskets and hampers wherein the lids have been previously equipped with securing devices, an apparatus for raising and lowering a basket or hamper, a lid holding means, and mechanism in conjunction with said lid holding means for acting upon said securing devices when said apparatus raises the basket or hamper into engagement with a lid carried by said lid holding means.

2. In a machine for fastening lids on baskets and hampers wherein the lids have been previously equipped with securing devices, a lid holding means, a basket carrying means, an apparatus for shifting one of said means where a lid and a basket or hamper carried by their respective means are brought into juxtaposition, and mechanism engageable with said securing devices for directing the same into said basket or hamper.

3. In a machine for fastening lids on baskets and hampers wherein the lids have been previously equipped with securing devices, a gripping means arranged to hold a lid by its edge, a basket support, mechanism for bringing the lid and basket or hamper into juxtaposition, centering means for aligning said basket or hamper and lid, and mechanism engageable with said securing devices for directing the same into said basket or hamper.

4. In a machine for fastening lids on baskets and hampers wherein the lids have been previously equipped with securing devices, a basket support, gripping and guide means arranged to hold a lid by its edge, mechanism for bringing the lid and basket or hamper into juxtaposition, centering means for aligning said basket or hamper and lid, said gripping and guide means including elements arranged to enter the basket or hamper and guide said lid into a seated relation therewith, and mechanism engageable with said securing devices for directing the same into said basket or hamper.

5. In a machine for fastening lids on baskets and hampers wherein the lids have been previously equipped with securing devices, a universally shiftable table arranged to receive a basket or hamper, a centering means engageable with the sides of the basket or hamper at its open end, a lid holding means within the confines of said centering means arranged to support a lid in receptive relation with a basket or hamper centered by said centering means, and mechanism in association with said lid holding means and centering means for engaging the securing devices on said lid and directing the same into the adjacent portions of the basket or hamper.

6. In a machine for fastening lids on baskets and hampers wherein the lids have been previously equipped with securing devices, a universally shiftable table arranged to receive a basket or hamper, a lidding apparatus disposed above said table and comprising, a plurality of radially shiftable centering members, a lid holding means within the area defined by said centering members arranged to releasably support a lid, and mechanism arranged to act upon said securing devices, and elevating means carrying said table for raising a basket or hamper into engagement with said centering members whereby the lid and basket or hamper are brought into juxtaposition, said mechanism adapted to force said securing devices into engagement with the basket or hamper.

7. In a machine for fastening lids on baskets and hampers wherein the lids have been previously equipped with securing devices, a universally shiftable table arranged to receive a basket or hamper, a lidding apparatus disposed above said table and comprising a plurality of radially shiftable centering members, a plurality of radially operable fingers arranged substantially concentrically with and within the area delineated by said centering members, the radially inner sides of said fingers forming gripping means, the outer sides thereof forming directing guides adapted to pass into the mouth of a basket or hamper suitable for said lid, and a mechanism arranged opposite each of the several securing devices carried by said lid, and elevating means carrying said table for raising a basket or hamper into engagement with said centering members whereby the lid and basket or hamper are brought into juxtaposition, said mechanism adapted to force said securing devices into engagement with the basket or hamper.

8. In a machine for fastening lids on baskets and hampers wherein the lids have been previously equipped with securing devices, a universally shiftable table arranged to receive a basket or hamper, a lidding apparatus disposed above said table and comprising, a support, a plurality of radiating centering members carried thereby, a disk, means yieldably supporting said disk from said support, a plurality of radiating lid retaining fingers overhanging the periphery of said disk arranged to releasably support a basket lid, and mechanism carried by said support and operable upon relative movement of said disk and support to act upon the securing devices carried by said lid, and elevating means carrying said table for raising a basket or hamper into engagement with said centering members whereby the lid and basket or hamper are brought into juxtaposition, said disk responsive to pressure of said basket or hamper against its lid to shift relatively to said support and thereby actuate said mechanisms whereby said mechanisms force the several securing devices into said basket or hamper.

9. In a machine for fastening lids on baskets and hampers wherein the lids have been previously equipped with securing devices, a lidding apparatus comprising a support, a plurality of radiating basket or hamper centering members carried thereby, a disk, means yieldably supporting said disk from said support, a plurality of radiating lid retaining fingers overhanging the periphery of said disk arranged to releasably support a basket or hamper lid, and mechanism carried by said support and operable upon relative movement of said disk and support to act upon the securing devices carried by said lid.

10. In a machine for fastening lids on baskets and hampers wherein the lids have been previously equipped with securing devices, a lidding apparatus comprising a plurality of radiating basket centering members arranged to fit around the mouth of a basket, a plurality of radially operable fingers arranged substantially concentrically with and within the area delineated by said centering members, the radially inner sides of said fingers forming gripping means, the outer sides thereof forming directing guides adapted to pass into the mouth of a basket or hamper suitable for said lid when the basket is in juxtaposition, and a mechanism arranged opposite each of the several securing devices for directing the same into said basket or hamper.

11. In a basket or hamper lid fastening machine for round baskets and hampers and their lids, means for shifting and guiding a basket or hamper and its lid into coacting relation including centering members engageable with a round basket or hamper, lid holding elements having portions adapted to direct a lid held thereby into the basket or hamper upon positioning of said basket or hamper by said centering elements, and simultaneously acting mechanisms for applying a plurality of securing devices in connective relation with said basket or hamper and lid.

12. In a basket lid fastening machine for round baskets or hampers and their lids, a lidding apparatus comprising a support, a plurality of radiating basket centering members carried thereby, a disk mounted below said support, a plurality of radiating lid retaining fingers overhanging the periphery of said disk arranged to releasably support a basket or hamper lid, and simultaneously acting mechanisms operable when said basket or hamper and lid are in coactive relation for applying a plurality of securing devices in connective relation with said basket or hamper, and lid.

13. In a basket or hamper lid fastening machine for round baskets and hampers and their lids, means for shifting and guiding a basket or hamper and its lid into coacting relation including centering members engageable with a round basket or hamper, lid holding elements having portions adapted to direct a lid held thereby into the basket or hamper upon positioning of said basket or hamper by said centering elements, simultaneously acting mechanisms for applying a plurality of securing devices in connective relation with said basket or hamper and lid, and yieldable means connected with the centering members for permitting radially expansion and adaption of said centering members to the irregularities of said basket or hamper.

14. In a basket or hamper lid fastening machine for round baskets and hampers and their lids, a lidding apparatus comprising a support, a plurality of radiating basket centering members carried thereby, a disk mounted below said support, a plurality of radiating lid retaining fingers overhanging the periphery of said disk arranged to releasably support a basket or hamper lid, simultaneously acting mechanisms operable when said basket or hamper and lid are in coactive relation for applying a plurality of securing devices in connective relation with said basket or hamper and lid, and yieldable means connected with the centering members for permitting radially expansion and adaption of said centering members to the irregularities of said basket or hamper.

15. In a basket or hamper lid fastening machine for round baskets and hampers and their lids, means for shifting and guiding a basket or hamper and its lid into coacting relation including centering members engageable with a round basket or hamper, lid holding elements having portions adapted to direct a lid held thereby into the basket or hamper upon positioning of said basket or hamper by said centering elements, simultaneously acting mechanisms for applying a plurality of securing devices in connective relation with said basket or hamper and lid, said lid holding elements being radially shiftable, means linking the several holding elements, whereby they shift in unison, and spring means for yieldably retaining said elements in their radially inner positions.

16. In a basket or hamper lid fastening machine for round baskets and hampers and their lids, a lid holding means comprising fingers gripping the edges of a circular lid, said fingers arranged to enter the mouth of a basket or hamper suitable for said lid and brace the walls of the basket or hamper, means for directing and centering a basket or hamper relative to said lid and its holding means whereby the fingers may enter the basket or hamper, and radially inwardly acting mechanisms for applying securing devices in connective relation with said basket or hamper and lid, said fingers holding the basket or hamper to its form against the action of said mechanisms.

17. In a basket or hamper lid fastening machine for round baskets and hampers and their lids, a lid holding means comprising fingers gripping the edges of a circular lid, said fingers arranged to enter the mouth of a basket or hamper suitable for said lid and brace the walls of the basket or hamper, radiating centering members for directing and centering a basket or hamper relative to said lid and its holding means whereby the fingers may enter and brace the basket or hamper, yieldable elements connected with the several centering members for permitting radial expansion thereof whereby said centering members yieldably grip the sides of the basket or hamper and conform thereto, and radially inwardly acting mechanisms for applying securing devices in connective relation with said basket or hamper and lid, said fingers holding the basket to its form against the action of said mechanisms.

HAROLD MATTHEWS.
JAMES HENRY WARNTJES.
EDWARD ARTHURS.
WILLIAM CARL WILKINSON.